(12) United States Patent
Nasilowski et al.

(10) Patent No.: US 10,866,081 B2
(45) Date of Patent: Dec. 15, 2020

(54) WAVEGUIDE INTERFEROMETER

(71) Applicant: INPHOTECH SP. Z O.O., Warsaw (PL)

(72) Inventors: Tomasz Nasilowski, Warsaw (PL); Marek Napierala, Warsaw (PL); Anna Makowska, Warsaw (PL); Michal Murawski, Warsaw (PL); Dawid Budnicki, Sanniki (PL); Janusz Fidelus, Mucharz (PL); Zbigniew Holdynski, Warsaw (PL); Lukasz Szostkiewicz, Torun (PL); Lukasz Ostrowski, Nieporet (PL); Karol Wysokinski, Gdynia (PL); Ana Pytel, Warsaw (PL)

(73) Assignee: INPHOTECH SP. Z O.O., Warsaw (PL)

( * ) Notice: Subject to any disclaimer, the term of this patent is extended or adjusted under 35 U.S.C. 154(b) by 0 days.

(21) Appl. No.: 16/434,733

(22) Filed: Jun. 7, 2019

(65) Prior Publication Data

US 2019/0310069 A1 Oct. 10, 2019

Related U.S. Application Data

(63) Continuation of application No. PCT/PL2017/050059, filed on Dec. 6, 2017.

(30) Foreign Application Priority Data

Dec. 6, 2016 (PL) .................................. P.419701

(51) Int. Cl.
*G01B 9/02* (2006.01)
*G01B 11/06* (2006.01)
(Continued)

(52) U.S. Cl.
CPC .......... *G01B 9/02015* (2013.01); *G01B 9/02* (2013.01); *G01B 11/0675* (2013.01);
(Continued)

(58) Field of Classification Search
CPC ...... G02B 6/02042; G02B 6/10; G02B 6/024; G01B 9/02; G01B 9/02049; G01B 9/0205
See application file for complete search history.

(56) References Cited

U.S. PATENT DOCUMENTS

| | | | |
|---|---|---|---|
| 6,400,870 B1* | 6/2002 | Hill ...................... | G02B 6/2821 385/3 |
| 2007/0065075 A1* | 3/2007 | Berger ...................... | G01J 3/02 385/37 |
| 2011/0136132 A1* | 6/2011 | Tseng ................. | A61B 5/14528 435/7.1 |

* cited by examiner

*Primary Examiner* — Jonathan M Hansen
(74) *Attorney, Agent, or Firm* — The Concept Law Group, PA; Scott D. Smiley; Scott M. Garrett

(57) ABSTRACT

A waveguide interferometer includes a multicore fiber used a multicore waveguide, where the multicore waveguide includes a coupler section formed by tapering a portion of the multicore waveguide so that one core though which a light source is fed is optically coupled to another core that is terminated differently that the core into which the source signal is provided. The terminations respond differently upon being exposed to an environmental condition or substance, and the difference in response to the environmental condition or substance results in a shift in interference of the light reflected back through the multicore waveguide, which is detected with a detector on the same side of the multicore waveguide as the light source.

15 Claims, 13 Drawing Sheets

(51) Int. Cl.
  *G02B 6/42* (2006.01)
  *G02B 6/024* (2006.01)
  *G02B 6/02* (2006.01)
(52) U.S. Cl.
  CPC ............ *G02B 6/4216* (2013.01); *G02B 6/024* (2013.01); *G02B 6/02042* (2013.01)

WAVEGUIDE INTERFEROMETER

CROSS-REFERENCE TO RELATED APPLICATION

This application claims priority to PCT Application No. PCT/PL2017/050059, filed Dec. 6, 2017, and to its priority application, Polish Patent Application No.P.419701, filed Dec. 6, 2016, the entirety of each of which are hereby incorporated by reference.

FIELD OF THE INVENTION

The present disclosure relates generally to an interferometer made on a multicore waveguide, particularly on a waveguide, either fibrous or planar, the essence of which is to apply the core activation process, as disclosed below.

BACKGROUND OF THE INVENTION

Measurement of the geometric thickness of something comprised of layers can be carried out with the use of a measuring instrument such as a micrometer, but requires a physical contact with the substance being measured by the measuring instrument, which is difficult in the case of measurements of deformable elements or liquids. The use of these type of measurement devices is also impossible when examining solutions or biological substances or when running biological tests, for instance when culturing and observing bacteria and viruses.

In turn, optical thickness is defined as the length of an optical path and is expressed by the product of the geometric thickness and the refraction coefficient of the material being measured, and this definition of optical thickness shall be applied hereafter in this document.

Examinations of substances of this type (deformable, liquids, etc.) are usually carried out under a microscope, which is time-consuming and requires the use of expensive and non-universal measuring and observation instruments. In-situ examination is also significantly hindered for these substances.

Generally speaking, optical thickness measurements can be carried out with the use of interferometers. Hence, the known methods of measuring the thickness of phase elements includes methods using interferometers, e.g. the Michelson interferometer or the Mach-Zehnder interferometer. Volumetric interferometers cannot, however, measure in-situ changes in optical thickness for relatively small layers of several to several hundred nanometers or single micrometers.

Various structures of waveguide interferometers are known in this field of technology, particularly those based on optical fibers. Also known are measurement methods assuming their use.

The structure of an optical fiber interferometer assuming the tapering of optical fiber was described in an article titled "Tapered fiber Mach-Zehnder Interferometer for Liquid Level Sensing", written by Hun-Pin Change and associates, published by PIERS Proceedings in 2013. The structure of the element is based on the use of a standard single-mode fiber and the execution of two non-adiabatic taperings on this fiber. The idea behind the operation of this interferometer is based on the measurement of interference of these modes after the second tapering. The interferometer is used to measure liquid levels. Multicore waveguides are not used in this approach.

In an article titled "Simple All-Microconstructed-Optical-Fiber Interferometer Built Via Fusion Splitting", written by Joel Villatoro and associates, published by the Optics Express in 2007, presents a single-core photonic fiber interferometer concept, whereby the fiber is spliced in two places to enclose openings that serve as couplers.

A review article titled "Recent Progress of In-Fiber Integrated Interferometers", written by Libo Yuan and published by PhotonicSensors in 2011, presents a concept for Mach-Zehnder and Michelson interferometer structures based on tapered double-core fibers. The Michelson interferometer in the proposed structure of the article has a mirror on the entire fiber terminal's face surface. Upon passing through a tapering and being reflected off the mirror, the signals interfere with each other.

The concept of a local tapering of double-core fibers is also known from an article titled "Gemini Fiber for Interferometry and Sensing Applications" by E. Zetterlund and associates, published in the Journal of Sensors in 2009. According to this concept, no substances are applied on the cores of optical fibers (i.e. the fibers are not activated). The example presented in the article is characterized by equal-measuring arms.

The structure of a multicore fiber interferometer was also described in an article titled "All-Solid Multi-Core Fiber-Based Multipath Mach-Zehnder Interferometer for Temperature Sensing", written by Ming Tang and associates and published in Applied Physics B in 2013. The authors point to the sensor application of the interferometer, which can be particularly used to measure temperature. In this concept, the optical fiber is spliced with an SMF-28 fiber by connecting to the intra-core casing instead of the centers of particular cores. In this case, the authors point to the application of multibeam interference. In traditional interferometers, splices made in intra-core spaces serve as couplers.

In an article entitled "Multicore Microstructured Optical Fiber for Sensing Applications", written by L. Sojka and associates, published in Optics Communications in 2015, presents a concept for a multibeam Mach-Zehnder interferometer, based on a seven-core microstructured fiber. Splices made at both ends of the fiber serve as couplers. The fiber used has coupled cores, thanks to which the effect of external factors on intra-core power transfer can be truly examined.

An idea for the structure of a multi-parameter sensor based on multicore fibers (spatial multiplexing), and specifically on multicore fibers with heterogeneous cores, was presented in an article titled "Spatial-Division Multiplexed Mach-Zehnder Interferometers in Heterogeneous Multicore Fiber for Multiparameter Measurement", written by Lin Gan and associates and published in the IEEE Photonics Journal in 2016. According to the concept, a Mach-Zehnder interferometer is built on a seven-core fiber having two taperings. All seven cores are activated at the input by a fan-in/fan-out element. At the end of the system, power is collected from all cores by a fan-in/fan-out element as well. By changing the parameters of the tapering (i.e. by strain and temperature changes), other interference images are collected at the output, using a detector. This concept is dedicated to temperature and strain measurements, and the authors claim cross-sensitivity can be eliminated.

In another example of sensor structure, as presented in description ref. U.S. Pat. No. 4,653,906, a device comprising multicore fibers is used to measure strain. In this solution, a double-core fiber is fixed to a strain-transferring structure.

Strain experienced by the fiber changes the value of crosstalk among cores, which corresponds to the strain experienced by the optical fiber.

The concept of chemical etching of twin-core fiber was presented in A. Zhou al.: "Asymmetrical Twin-Core Fiber Based Michelson Interferometer for Refractive Index Sensing" published in Journal of Lightwave Technology in 2011. According to this concept an asymmetrical twin-core fiber based Michelson interferometer is reported as a refractive index sensor. One core of the twin-core fiber is located at the fiber center and the other core is 26 µm away from the central core. Part of the cladding of the twin-core fiber over a small length is removed by chemical etching to make the effective refractive index of the fundamental mode of the side core sensitive to the ambient refractive index.

The concept of sensing with an etched area was disclosed in Libo Yaun "In-Fiber-Integrated Optic Devices for Sensing Applications" published in Proc. SPIE 8421 in 2012. According to this concept, based on an in-fiber integrated Michelson interferometer, a compact and small size accelerometer has been proposed and demonstrated, both the working principle and basic configuration. In another example, by using a segment of eccentric twin-core fiber, an in-fiber integrated Mach-Zehnder interferometer may formed inside one fiber and used as a refractive index sensor.

The concept of active layers was presented in the description of CN105589223. According to this concept, in a multi-core fiber splitter having a phase modulation function, an optical waveguide is formed on the substrate by a lithium niobate substrate having an optical effect, and a modulation electrode for modulating a propagating light wave in the optical waveguide is used for input. A multi-core optical fiber, a V-shaped groove, a ceramic substrate, and a single-core optical fiber for guiding the outgoing light; the input optical fiber adopts a three-core optical fiber, and three optical waveguides are formed by using lithium niobate crystal as a substrate, and are embedded on both sides of the optical waveguide. Parallel electrodes are guided by a single-core fiber for the output light. The invention adopts multi-core optical fiber as an input, which not only improves the density of the core, mechanical properties and temperature diffusion characteristics, but also increases the effective area of the core and improves the output power of the light.

In another example of sensor structure, as presented in description ref. US2013271771, an interference measurement device include a multi-core optical fiber having first and second ends. The device also has a light source, an optical receiver, a branching unit, a coupling unit, a measurement optical path, and a reference optical path. The device measures a physical quantity of an object to be measured on the measurement optical path. The light source and optical receiver are arranged on the first end side, while the measurement optical path and reference optical path are arranged on the second end side. The branching unit splits light from the light source into measurement light and reference light, while the coupling unit generates interference light between the measurement light having propagated through the measurement optical path and the reference light having propagated through the reference optical path. The optical receiver detects the intensity of the interference light.

The concept of tapering was presented in description ref. WO2016137344, which describes a fiber optic coupler, containing a multi-core optical fiber with insulated cores, whereas core insulation is construed as the occurrence of zones characterized by reduced refractive index in the core neighborhood, characterized in that it contains at least one input optical fiber jointed to at least N-core multicore optical fiber with insulated cores, which is jointed to N output optical fibers, and core insulation is reduced in at least one section of the multicore optical fiber by reducing the dimensions of the reduced refractive index zone dimensions in the core neighborhood.

The concept of sensor based on Michelson interferometer was presented in R. Kashyap et al: "An All Single-Mode Fiber Michelson Interferometer Sensor" published in Journal of Lightwave Technology in 1983. According to this concept, a Michelson interferometer is made from a single-mode fiber directional coupler with silver mirrors deposited on fiber ends is presented. This interferometer is simple to fabricate and has a theoretical visibility of unity, irrespective of the splitting ratio of the coupler. A theoretical analysis of its performance was described.

The above presented solutions based on interferometers made on multicore fibers are predominantly dedicated to strain and temperature measurements. They are however unsuitable for effective measurement of optical thickness of layers. The structures of their systems do not enable core activation either. Therefore, there is a need for a solution to these and related problems.

SUMMARY OF THE INVENTION

It is a purpose of this disclosure to teach a waveguide interferometer, particularly an optical fiber interferometer, for measuring optical thickness and/or adsorption of thin layers. The use of waveguide interferometers opens technology to new possibilities, whereby interferometer tests are used in studies requiring significant miniaturization—such applications were not accessible for volumetric interferometers. Effective measurement with the use of the inventive disclosure is possible thanks to the arm activation process. An additional advantage of the inventive disclosure is that its concept, known from volumetric optics, is reinforced by the effect of interferometer imbalance. Another goal of the inventive disclosure is to develop an interferometer structure, which would be also suitable for measuring other physical values, such as: temperature, elongation/expansion, strain, pressure, gas concentration and others. The changes of those values are further called the changes of environmental factor.

Some embodiments of the inventive disclosure provide a waveguide interferometer for measuring optical parameters having a light source feeding a light to a splitter and to one side of a multicore waveguide having at least a first core and a second core, where the first core has an output on the opposite side of multicore waveguide. The splitter is provided on the multicore waveguide. An output of the first core is coated with at least one chemically active substance. The first core is connected directly or indirectly to a signal detector situated on the same side of the multicore waveguide as the light source.

In general terms, the active substance changes its optical thickness and/or absorption by reacting with the environment. In particular, the active substance is a sorbent of chemical substances from the environment and/or a substance which swells/shrinks when exposed to external factors and/or a substance which binds chemical substances from the environment. The detector displays interference stripes in a spectral band (wavelength), the shift and/or contrast of which depends on the change of optical thickness and/or the absorption of the layer. In this case, a change of the optical thickness of the measured layer changes the position of the interference stripes. The invention provides a waveguide interferometer that overcomes the hereinaforementioned disadvantages of the heretofore-known devices and methods of this general type.

With the foregoing and other objects in view, there is provided, in accordance with the invention, a waveguide interferometer for measuring optical parameters, which has a light source configured to feed a light to one side of a multicore waveguide with a splitter, wherein the multicore waveguide has at least a first core and a second core, where the first core has an output on the opposite side of multicore waveguide, wherein the splitter is provided on the multicore waveguide, wherein an output of first core is coated with at least one chemically active substance, and the first core is connected to a signal detector on the same side of the multicore waveguide as the light source.

In accordance with another feature, an embodiment of the present invention includes the at least one chemically active substance being able to couple itself to another substance.

In accordance with a further feature of the present invention, the at least one chemically active substance is able to detach from another substance when exposed to a selected environmental element.

In accordance with a yet one more feature of the present invention, the at least one chemically active substance changes thickness, absorption, and/or refractive index when exposed to a selected environmental element.

In accordance with an additional feature of the present invention, the multicore waveguide has more than two cores.

In accordance with an additional feature of the present invention, the first core of the multicore waveguide has a different length than the second core.

In accordance with another feature of the present invention, the first core of the multicore waveguide is extended with at least one dielectric section selected from a group including: a glass pin, a waveguide, and an optical fiber.

In accordance with one more feature, the present invention includes a fan-in/fan-out element that is connected to the multicore waveguide and at least one additional detector, wherein the at least one additional detector and the light source are connected to the fan-in/fan-out element.

In accordance with another feature of the present invention, a circulator is provided with a first port connected to the light source, a third port is connected to the signal detector, and a second port is connected to the multicore waveguide.

In accordance with another feature of the present invention, at least two of the cores are coated with different chemically active substances.

In accordance with another feature, the multicore waveguide is a polarization-maintaining waveguide.

In accordance with an additional feature, the multicore waveguide is a multicore fiber and comprises holes between the first core and the second core.

In accordance with another feature, the splitter is a multicore fiber coupler provided on the multicore waveguide as an area having decreased crosswise dimension.

In accordance with a further feature of the present invention, the splitter is a planar lightwave circuit splitter and the multicore waveguide is a planar lightwave circuit waveguide.

In accordance with one more feature of the present invention, the chemically active substance is a substance selected from a group that includes yttrium oxide, perfluorinated polymer, hydrolyzed collagen, polystyrene, and ethylcellulose.

Although the invention is illustrated and described herein as embodied in a waveguide interferometer, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the waveguide. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
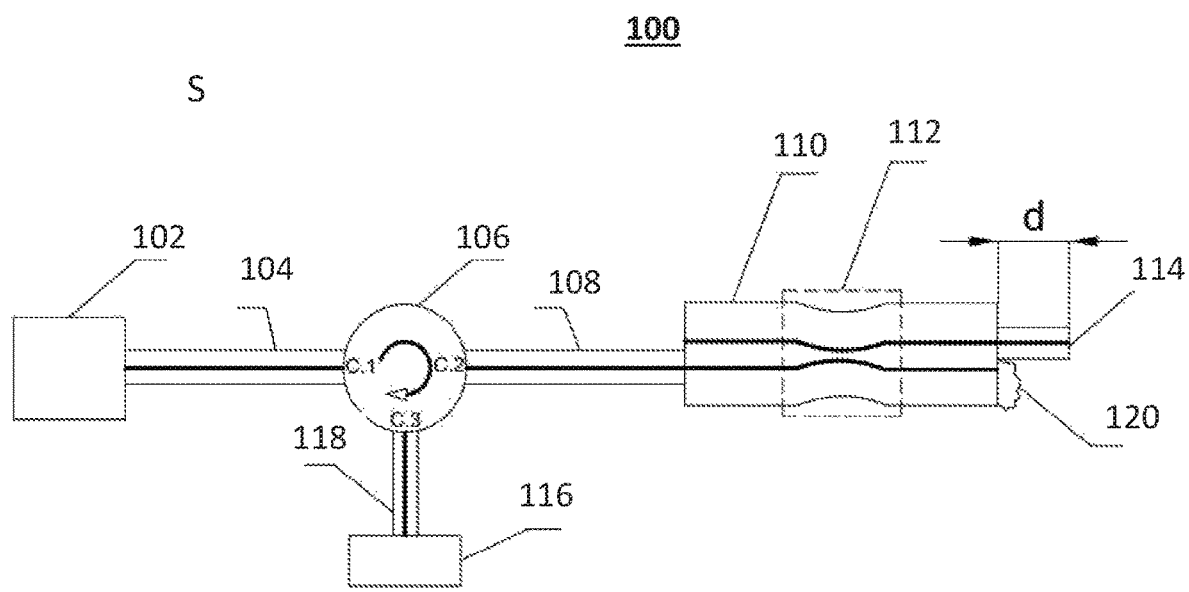
FIG. 1 shows a waveguide interferometer of a first example, in accordance with some embodiments.

While the specification concludes with claims defining the features of the disclosure that are regarded as novel, it is believed that the disclosure will be better understood from a consideration of the following description in conjunction with the drawing figures, in which like reference numerals are carried forward. It is to be understood that the disclosed embodiments are merely exemplary of the disclosure, which can be embodied in various forms.

Figure 3:
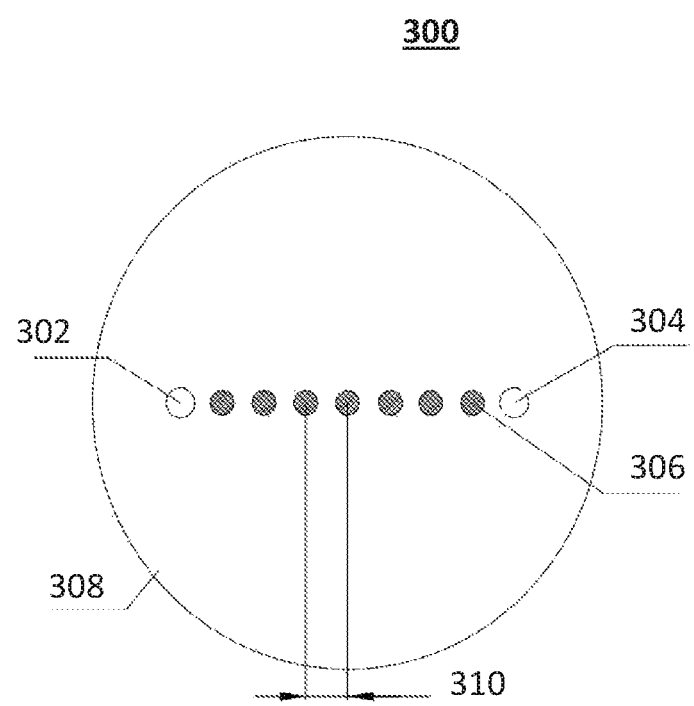
FIG. 3 cross section view of a multi-core fiber for a waveguide interferometer, in accordance with some embodiments.

FIG. 1 shows a waveguide interferometer 100 of a first example, in accordance with some embodiments. FIG. 3 shows a cross sectional view 300 of a double-core fiber 110 used in the waveguide interferometer 100.

Example 1

A light source 102 is connected through a first optical fiber 104 to a first port C.1 of a circulator 106, and optical fiber 108 is connected to the second port C.2 of the circulator 106 and is further connected to a double-core fiber 110 with a coupler 112 formed in the double-core fiber 110. The face of one of the cores of the double-core fiber 110 is activated by splicing in a section of optical fiber 114 which is the second core of the double-core fiber 110, and the first core is connected to the core of optical fiber 108. A detector 116 is connected to the third port C.3 of the circulator 106 through an optical fiber 118.

A signal from light source 102 travels down optical fiber 104 to the circulator 106 at port C.1. The second port C.2 is connected to the first core of the multi-core fiber 110 by means of optical fiber 108, and via the third port C.3 to the detector 116. A superluminescence diode can serve as the light source 102, and the detector 116 preferably comprises a spectrometer. One of the cores of the multicore fiber 110 is activated at its output by connecting an optical fiber 114 using any of the known methods, particularly by splicing. The activated core beneficially differentiates the optical paths of the interferometer arms. The first core of the double-core fiber 110 is blocked by a layer of substance 120.

As shown in FIG. 3, the double-core optical fiber 110 comprises:

two cores 302 and 304 made of $SiO_2$ doped with $GeO_2$ and being 8.2 μm in total diameter, and doped with 3.5 molar % $GeO_2$.

A casing 308 having a 125 μm diameter, made of non-doped $SiO_2$ silica;

seven air holes 306 being formed in a line between the cores 302, 304, each having a diameter of 7.2 μm.

The cores 302, 304 and the holes 306 are formed along a line, and their centers are located every 9 μm (310).

The length "d" in FIG. 1 of the tied-in optical fiber 114 section is 1 mm.

Figure 2:
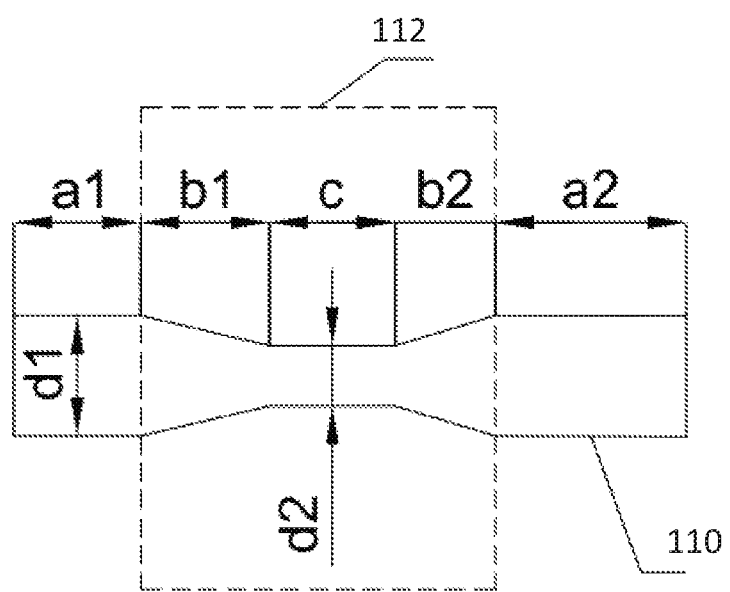
FIG. 2 shows a detail of a coupler for a waveguide interferometer, in accordance with some embodiments.

The coupler 112 is shown in detail in FIG. 2, and is made as a tapering with hole. The parameters of the tapering are: b1=7 mm, c=10 mm, b2=8 mm. The fiber 110 is tapered in a manner such that waist region "c" has a diameter d2=0.3 (d1).

Leaving the second port C.2 of the circulator 106, the signal is directed through a single-core optical fiber 108 to one of the cores of a multicore optical fiber 110, which contains the coupler 112. In the multicore fiber 110, the signal is propagated in one of the cores until reaching the coupler 112, which splits the signal between both cores of multicore fiber 110. In one of the cores, the signal is reflected off the distal tip of the connected fiber 114, and the signal from the second core is reflected off the tip of the double-core fiber 110 covered by substance 120. Reflected light returns through the double-core fiber 110 and the coupler 112 connected to it, and then reaches the detector 116 through the circulator 106. The detector 116 displays interference stripes in a spectral band (wavelength), the shift and/or contrast of which depends on the change of parameters of the connected optical fiber 114. In this case, the measured change of position of interference stripes is approx. 5 nm for section 114 changing by approx. 1 με.

Thus, changes in length of core section 114 can be determined based on the interference pattern changes produced by the detector 116.

Example 2

Figure 5:
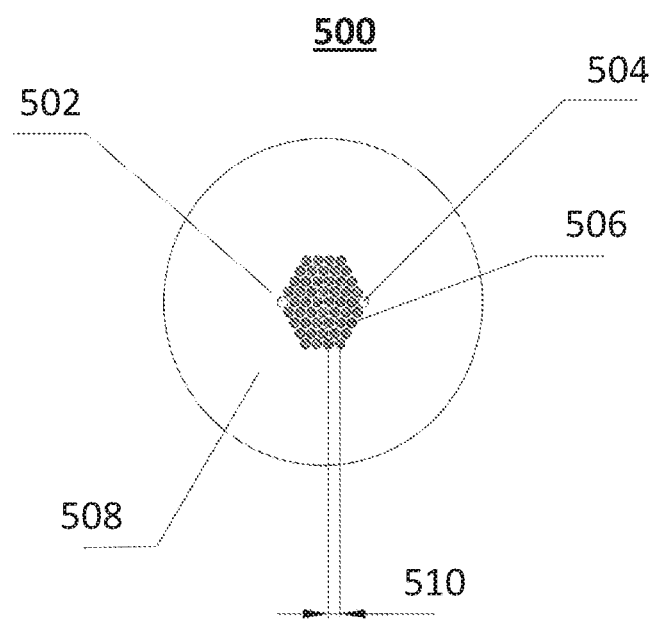
FIG. 5 cross section view of a multi-core fiber for a waveguide interferometer, in accordance with some embodiments.

The second example utilizes a waveguide interferometer 400 and a double-core fiber 414 that has a cross section 500 as shown in FIG. 5.

Figure 4:
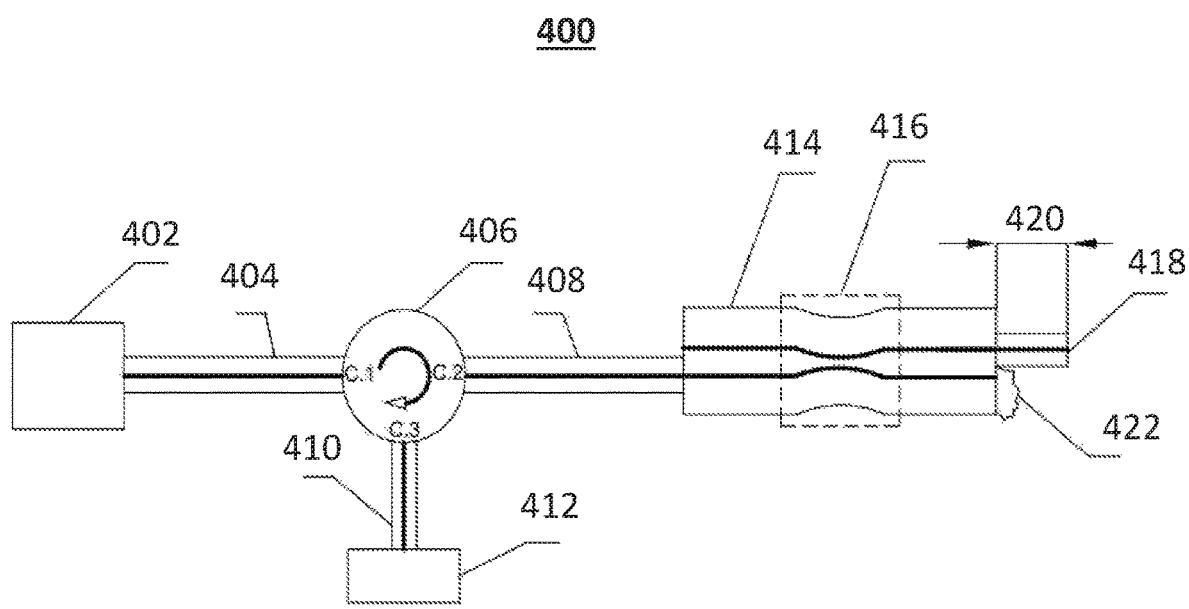
FIG. 4 shows a waveguide interferometer of a further example, in accordance with some embodiments.

Referring now to FIG. 4, a light source 402 is connected through an optical fiber 404 to the first port C.1 of the circulator 406, and optical fiber 408 is connected to the second port C.2 of the circulator 406 and is also connected to a double-core fiber 414 that has a coupler 416 formed in the double-core fiber 414. A face of one of the cores of double-core fiber 414 is activated by coating 422, and a section of an optical fiber 418. A detector 412 is connected to the third port C.3 through an optical fiber 410.

Signal from light source 402—a super electroluminescence diode—travels the single-core optical fiber 404 to the circulator 406. The second port C.2 is connected to one of the cores of a double-core fiber 414 with homogeneous cores 502 and 504 by means of single-core optical fiber 408. The third port C.3 leads to a detector 412, which is a spectrum analyzer in the form of a spectrometer. Optical fiber 408 is connected to the double-core fiber 414 which contains the coupler 416 that is made by enclosing holes without additional tapering. One of the cores 502, 504 of the multicore fiber 414 is activated at its output by applying a layer of substance 422. A section of a single-core fiber 418 is connected to the second core 502 of the multicore fiber 414.

The double-core optical fiber 414 comprises:

two doped cores 502, 504 made of $SiO_2$ doped with 3.5% $Geo_2$ each having a diameter of 8.2 µm, and the distance between cores 502, 504 is 126 µm.

a casing 508 having a diameter of 250 µm, made of non-doped $SiO_2$ silica;

air holes 506 placed with the cores on nodes of a hexagonal lattice with a lattice constant 510 of 18 µm, and the diameters of the holes are 0.8 of the lattice constant 510, or 14.4 µm.

The coupler 416 is made by enclosing holes at a length of 3 mm without additional tapering. The single-core fiber section 418 spliced to the double-core fiber is characterized with the same doping and core dimensions as cores 502 and 504 and is 50 µm long.

The substance used applied on the core 504 is a perfluorinated polymer solution with a refractive index of approx. 1.33. Substance 422 can be placed on the core 504 by immersing the fiber 414 in the perfluorinated polymer solution. Exposed to the effects of cooling media comprising carbon, chlorine and fluoride compounds, such as 1,1,2-Trichloro-1,2,2-trifluoroethane, the layer of substance 422 swells. In this configuration, the thickness of the substance 422 changes by approximately 10 nm, which corresponds to a stripe shift by approx. 2 nm.

Leaving the second port C.1, the signal is directed through a single-core optical fiber 404 to the double-core optical fiber 414, which contains the coupler 416. In the double-core fiber 414, the signal is propagated in one of the cores until reaching the coupler 416, which splits it between the fiber cores 502, 504. In one of the cores, the signal is reflected off the tip of the connected fiber 418, and the signal from the second core is reflected off the substance 522 on its tip. Reflected light returns through the double-core fiber 414 and the coupler 416 mounted on it, and then reaches the detector 412 through the circulator 406. The detector 412 displays interference stripes in a spectral band (wavelength), the shift and/or contrast of which depends on the change of optical thickness and/or 1 absorption of the substance 422.

Example 3

Figure 6:
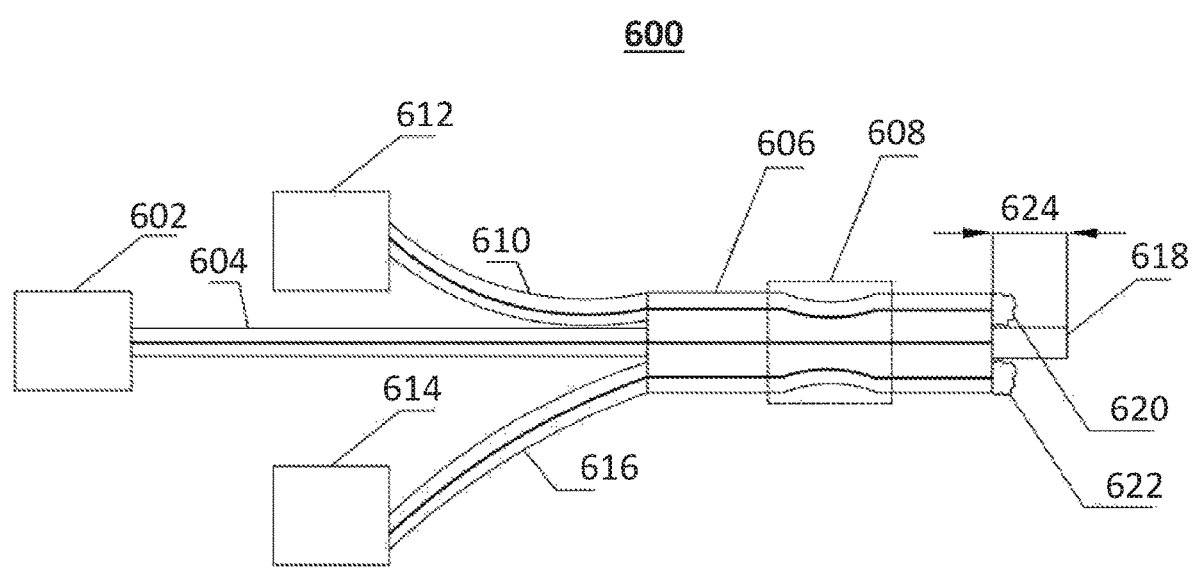
FIG. 6 shows a waveguide interferometer of a further example, in accordance with some embodiments.
Figure 7:
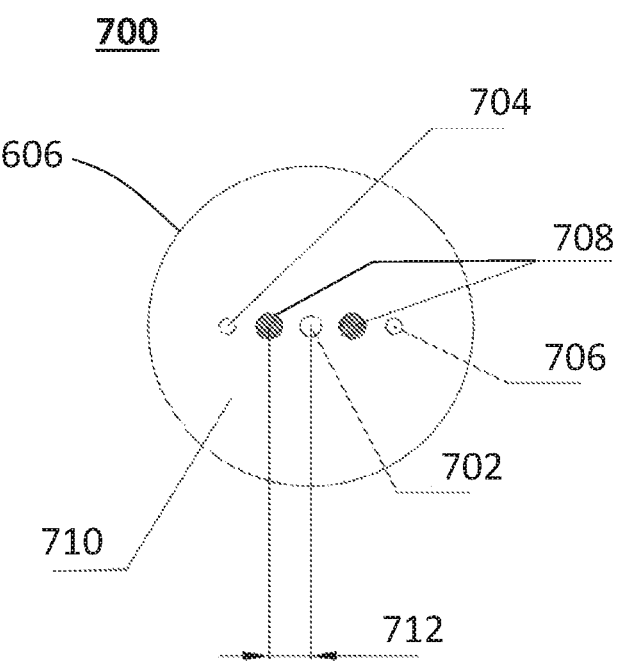
FIG. 7 shows a cross sectional view of a multi-core fiber optic cable for a waveguide interferometer, in accordance with some embodiments.

A third example uses the waveguide interferometer 600 of FIG. 6, and a three core multi-core fiber, a cross section 700 of which is shown in FIG. 7. In FIG. 6 a source 602 is connected through an optical fiber 604 to the input of one of the cores of a three-core fiber 606, with a coupler 608 made on it, and a glass pin 618 is spliced to one of the cores, behind the coupler 608, and the remaining faces of three-core fiber 606 cores are activated by applying layers 620 and 622 of a substance. The cores of the three-core fiber 606 are connected to detectors 612, 614 by means of fibers 610, 616, respectively, on the side of the light source 602.

A signal from light source 602 is directed to one of the cores of the three-core fiber 606. A supercontinuum source serves as the light source 602 and transmits light through the single-core input fiber 604 to the central core of the three-core fiber 606. Detectors 612, 614 are connected to the remaining cores of the fiber 606 by means of input fibers 610, 616. The coupler 608 is formed on the three-core fiber 606, and two of the cores are activated at their outputs by applying initial layer thicknesses 620 and 622. A glass pin section 618 is spliced to the third of the cores. Signal in the multicore fiber 606 is propagated in one of the cores until it reaches the coupler 608, which splits the signal among the three fiber cores.

The coupler 608 is made by enclosing holes in optical fiber 606 without additional tapering.

The optical fiber 606, as shown in cross section view 700 of FIG. 7, comprises:

three cores 702, 704 and 706 made of $SiO_2$ doped with $GeO_2$: the central core 702 can have a diameter of about 8.2 µm in total diameter is doped with 3.5 molar % $GeO_2$, the side core 704 has can have a diameter of about 6.1 µm and can be doped with 4.5 molar % $GeO_2$, the side-core 706 can have a diameter of about 6.24 µm and can be doped with 4.5 molar % $GeO_2$, a casing 710 can have a diameter of about 125 µm, and can be made of non-doped $SiO_2$ silica;

two air holes 708 between the cores, of 10 µm in total diameter.

The cores 702, 704, 706 and the holes 708 are lined together, and their centers are spanned 712 every 20 µm.

The coupler 608 is made by enclosing holes at the length of 5 mm without additional tapering beyond the coupler 608. These diameters of the fiber are selected so that light at a wavelength of 1.57 µm is propagated in the central core 702 and one of the external cores 706, and lights at wavelength of 1.45 µm propagates in the central core 702 and in the second of the external cores 704. Thus, the central core 702 gets two different wavelengths of light, and the outer cores 704, 706 each get one wavelength of light. The glass pin section 618 is spliced to the three-core fiber 606 is 80 µm long and is made of silica.

The substance 620 applied on the core 704 is Yttrium oxide, characterized by small porosity and a refractive index of approx. 1.8. Substance 620 can be obtained with the use of high-power laser pulses shot at the Yttrium oxide in a manner that its vapors settle on the fiber. A layer made in this manner can serve as a hydrochloric acid flooding sensor. When exposed to the effects of hydrochloric acid, the thickness of the layer changes by approx. 50 nm, which causes a shift of the stripes by approx. 5 nm.

At the same time, the substance 622 applied on the core 706 is perfluorinated polymer with a refractive index of approx. 1.33. Substance 622 can be placed on the core 706 by immersing the fiber in the polymer solution. Exposed to the effects of cooling media comprising carbon, chlorine and fluoride compounds, such as 1,1,2-Trichloro-1,2,2-trifluoroethane, the layer swells. In this configuration, the thickness of the substance changes by approx. 10 nm, which corresponds to a stripe shift by approx. 2 nm. After the light has passed through the coupler 608, it is propagated in particular cores and, reflecting off the measured layers 620 and 622 and the connected fiber 618, returns on the same path through the multicore fiber 606 to the detectors 612, 614.

The detectors 612, 614 display interference stripes in a spectral band (wavelength), the shift and/or contrast of which depends on the change of optical thickness and/or absorption of layers 620 and 622.

Example 4

Figure 8:
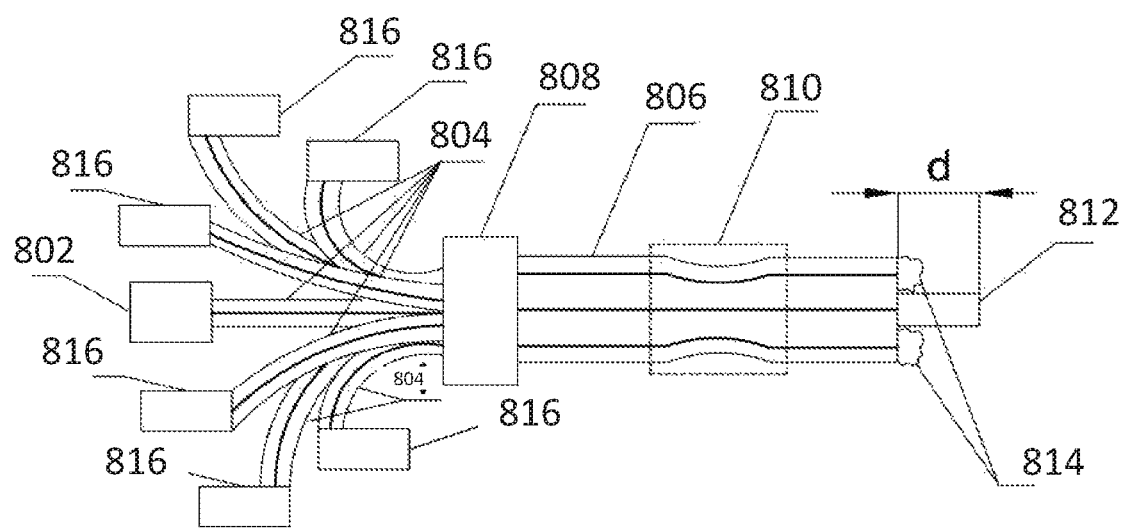
FIG. 8 shows a waveguide interferometer of a further example, in accordance with some embodiments.
Figure 9:
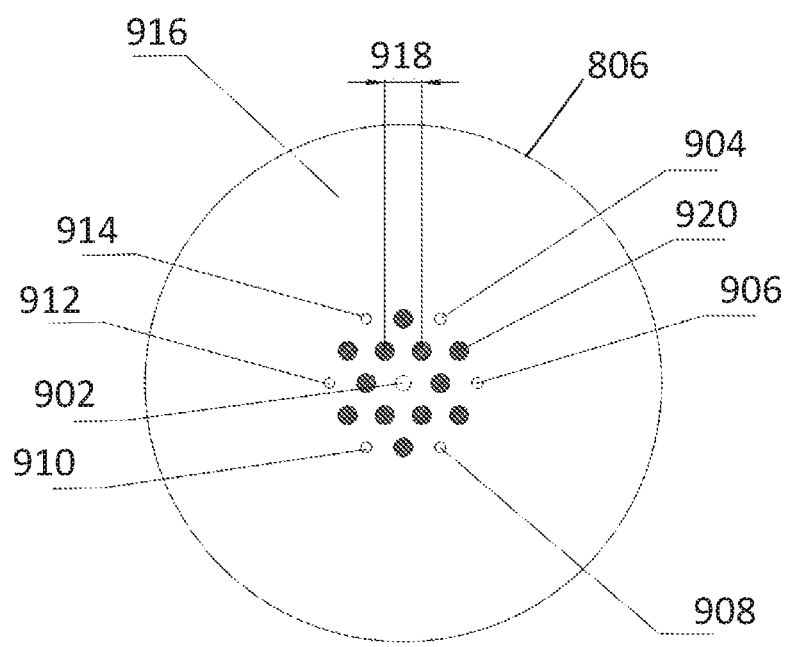
FIG. 9 shows a cross sectional view of a multi-core fiber for use in a waveguide interferometer, in accordance with some embodiments.

Referring to FIGS. 8 and 9, a light source 802 is connected through an optical fiber segment 804 to the input of one of the cores of a seven-core fiber 806 through a fan-in/fan-out element 808, and a coupler 810 is made on the seven-core fiber, and a glass pin 812 is spliced to the face of central core 902, and the faces of the external cores of the seven-core fiber 806 are activated by applying layers 814, and the cores of the seven-core fiber 806 are connected to detectors 816 on the side of the light source by means of fibers segments 804, after having passed through a fan-in/fan-out multiplexer element 808.

Signals from the light source 802 are directed to one of the cores of the seven-core fiber 806. A supercontinuum source serves as the light source 802, which directs the light through a corresponding one of the single-core input fiber segments 804 to the central core 902 of a multicore fiber 806. Detectors 816 are connected to the remaining optical fiber cores 904-914 through respective corresponding input fiber segments 804. Detectors 816 can be connected to each of the fibers 904-914, or a single detector can be switched in between optical fibers 904-914, e.g. manually or with the use of an optical switch. The coupler 810 is made on the seven-core fiber 806, and the external cores 904-914 are activated at their outputs by applying initial layer of substance 814 at a prescribed thicknesses. A glass pin section 812 is spliced to the central core 902. In the seven-core fiber 806, a signal is propagated in one of the cores until it reaches the coupler 810, which splits the signal among the fiber cores 902-914.

The coupler 810 is made by means of enclosing holes 920 in optical fiber 806 without additional tapering beyond the coupler 810. The diameters of the cores 902-914 of the optical fiber 806 are selected such that particular selected wavelengths are propagated in the central core 902 and in particular external cores 904-914.

The optical fiber comprises:
seven cores 902-914 made of $SiO_2$ doped with $GeO_2$:
central core 902 has a diameter of 8.2 μm, and is doped with 3.5 molar % $GeO_2$, external core 904 has a diameter of 6.24 μm, and is doped with 4.5 molar % $GeO_2$, external core 906 has a diameter of 6.1 μm, and is doped with 4.5 molar % $GeO_2$, external core 908 has a diameter of 5.96 μm, and is doped with 4.5 molar % $GeO_2$, external core 910 has a diameter of 5.82 μm, and is doped with 4.5 molar % $GeO_2$, external core 912 has a diameter of 5.86 μm, and is doped with 4.5 molar % $GeO_2$, external core 914 has a diameter of 5.54 μm, and is doped with 4.5 molar % $GeO_2$, a casing 916 has a diameter of 300 μm and is made of non-doped $SiO_2$ silica; air holes 920 between the cores, have a diamer of 10 μm.

The cores 902-914 are placed on nodes of a hexagonal lattice with a lattice constant 918 of $\wedge$=20 μm. The coupler 810 is made by enclosing holes at the length of 10 mm without additional tapering beyond the coupler 810. The diameters of the fiber are selected for light propagation as follows:

wavelengths of approx. 1.57 μm propagate in the core couple of cores 902, 904, wavelengths of approx. 1.45 μm propagate in the core couple of cores 902, 906, wavelengths of approx. 1.35 μm propagate in the core couple of cores 902, 908, wavelengths of approx. 1.25 μm propagate in the core couple of cores 902, 910, wavelengths of approx. 1.15 μm propagate in the core couple of cores 902, 912, wavelengths of approx. 1.05 μm propagate in the core couple of cores 902, 914.

The glass pin section 812 is 100 μm long and is made of silica.

The substance 814 applied is hydrolyzed collagen with a refractive index of 1. Substance 814 is applied by immersing the fiber in a 1% water solution of hydrolyzed collagen and drying it. This configuration is used to measure humidity, as collagen swells when exposed to cold water and airborne humidity. Immersed in water at 20° C., collagen swells, changing its thickness from 100 nm to 200 nm, and causing stripes to shift by approx. 2 nm. After passing through the coupler 810, the light is further propagated in particular cores and, reflecting off the measured layers 814 and the connected fiber 812, returns on the same path, through the multicore fiber 806, to the detectors 816. The detector 816 displays interference stripes in a spectral band (wavelength), the shift and/or contrast of which depends on the change of optical thickness and/or the absorption of the measured layers 814. In this case, a change of the optical thickness of the measured layer changes the position of the interference stripes.

Example 5

Figure 10:
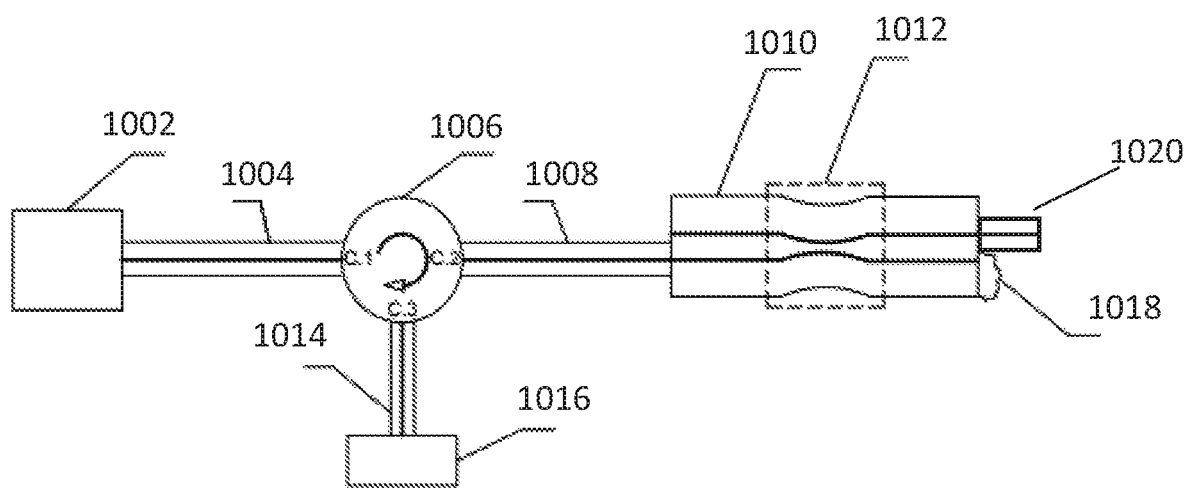
FIG. 10 is a waveguide interferometer of a further example, in accordance with some embodiments.
Figure 11:
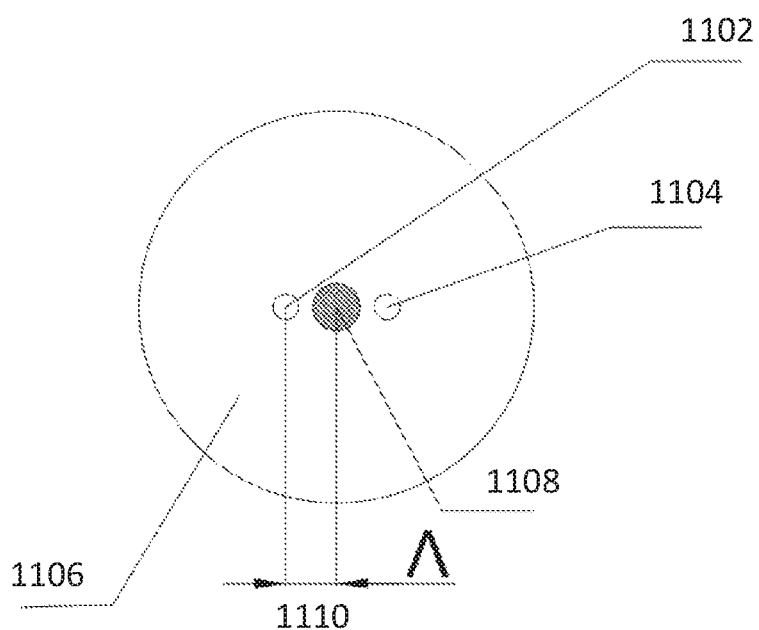
FIG. 11 shows a cross sectional view of a multi-core fiber for use in a waveguide interferometer, in accordance with some embodiments.

Referring now to FIGS. 10-11, a source 1 is connected through a polarization-preserving optical fiber 4 to the first polarization-preserving circulator port C.1, and polarization-preserving optical fibers 4 connected to the second port C.2 are also connected to a double-core fiber 6 with a coupler 7 made on it, and the face of one of the cores of double-core fiber 6 is activated applying a layer 5. A detector is connected to the third circulator 3 port C.3 through an optical fiber 4.

Signal from light source 1 travels optical fiber 4 to the first circulator 3 port C.1. The circulator 3 is a polarization-preserving circulator. The second circulator 3 port C.2 is connected to one of the cores of a double-core fiber 6 by means of polarization-preserving optical fibers 4. A super-luminescence diode serves as the light source 1.

Leaving the second circulator 3 port C.2, the signal is directed through a polarization-preserving single-core optical fiber 4 to one of the cores of a multicore optical fiber 6, which contains the coupler 7. In the multicore fiber 6, the signal is propagated in one of the cores until reaching the coupler, which splits it preferably between both fiber 6 cores. In one of the cores, the signal is reflected off the tip of the connected fiber 6, and the signal from the second core is reflected off the layer 5 at its tip. Reflected light returns through the double-core fiber 6 and the coupler 7 mounted on it, and then reaches the detector 2 through the circulator 3. The detector displays interference stripes in a spectral band (wavelength), the shift and/or contrast of which depends on the change of optical thickness and/or the absorption of the layer 5. In this case, a change of the optical thickness of the measured layer 5 changes the position of the interference stripes.

The coupler is made using any of the known methods, in particular by tapering and enclosing holes.

The optical fiber comprises:

two cores 9.1 and 9.2 made of $SiO_2$ doped with 3.5 molar % $GeO_2$ of 8.2 μm in total diameters, a casing 11 of d1=125 μm in total diameter, made of non-doped $SiO_2$ silica;

an air hole between the cores of 15 μm in total diameters.

The core and the holes are lined together, and their centers are spanned every $\wedge$=15 μm. The double-core fiber 6 is a polarization-preserving fiber.

The coupler 7 is made as a tapering with hole enclosing. The parameters of the tapering are: b1=b2=5 mm, c=5 mm. The fiber is tapered in a manner that d2=0.6·d1.

The substance 5 applied is polystyrene with a refractive index of approx. 1.5. Substance 5 is applied on the fiber by immersing the fiber in a 1% solution of methylene chloride and drying it. The layer swells when exposed to acetone, which is why the sensor can be used as acetone sensor. Immersed in room-temperature acetone, the layer increases its thickness by approx. 900 nm and causes the stripes to shift by approx. 120 nm.

Example 6

Referring to FIGS. 10-11, a source 1002 is connected through an optical fiber 1004 to a circulator 1006 at a first circulator port C.1, and an optical fiber 1008 connected to the second port C.2 is also connected to a double-core fiber 1010 with a coupler 1012 made on it, and the face of one of the cores 1102 of double-core fiber 1010 is activated by coating with an active substance 1018. A detector 1016 is connected to the third circulator port C.3 through an optical fiber 1014.

Signal from light source 1002 travels in optical fiber 1004 to the first circulator port C.1. The second circulator port C.2 is connected to one of the cores of a double-core fiber 1010 by means of optical fibers 1008. A superluminescence diode serves as the light source 1002.

Leaving the second circulator port C.2, the signal is directed through a single-core optical fiber 1008 to one of the cores of a multicore optical fiber 1006, which contains the coupler 1012. In the multicore fiber 1010, the signal is propagated in one of the cores until reaching the coupler 1012, which splits the signal between both cores of the fiber 1010. In one of the cores, the signal is reflected off the tip of the connected fiber 1020, and the signal from the second core is reflected off the layer 1018 at that tip. Reflected light returns through the double-core fiber 1010 and the coupler 1012 formed on it, and then reaches the detector 1016 through the circulator 1006. The detector 1016 displays interference stripes in a spectral band (wavelength), the shift and/or contrast of which depends on the change of optical thickness and/or the absorption of the layer 1018. In this case, a change of the optical thickness of the measured layer 1018 changes the position of the interference stripes.

The coupler 1012 is made using any of the known methods, in particular by tapering the fiber 1010.

The optical fiber 1010 comprises:

two cores 1102 and 1104 made of $SiO_2$ doped with 3.5 molar % $GeO_2$, and have a diameter of 8.2 μm;

a casing 1106 having a diameter of 125 μm that is made of non-doped $SiO_2$ silica;

The cores 1102, 1104 are lined together, and their centers are spanned 1110 every $\wedge$=25 μm.

The coupler 1012 is made as a tapering, such as that shown in FIG. 2. The parameters of the tapering are: b1=b2=5 mm, c=5 mm. The fiber 1010 is tapered in a manner that d2=½ that of d1.

The section of the single-core fiber 1020 spliced to the double-core fiber is characterized by the same doping and core dimensions as cores 1102 and 1104 and is 75 μm long.

The fiber 1020 is prepared by immersing in a solution containing sulfuric acid and 30% perhydrol in a 3:1 ratio for an hour. A surface prepared in this manner is active and, after placing the fiber 1020 in a solution containing allylamine polyhydrochloride, a polymer layer 2 nm thick and with a refractive index of approx. 1.5 is connected to the fiber 1020. Connecting a 2 nm layer causes a 0.5 nm shift of the stripes produced by the detector 1016. The sensor is used to detect allylamine polyhydrochloride.

Example 7

Figure 12:
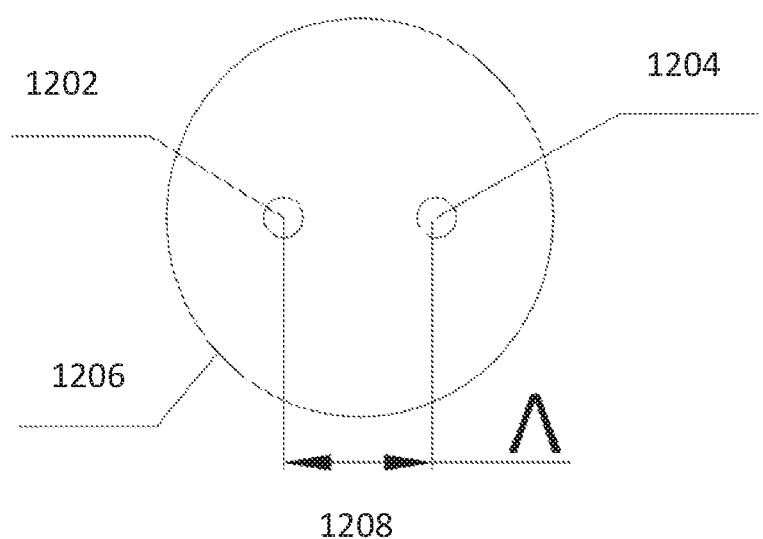
FIG. 12 shows a cross sectional view of an alternative multi-core fiber for use in a waveguide interferometer, such as that shown in FIG. 10, in accordance with some embodiments.
Figure 13:
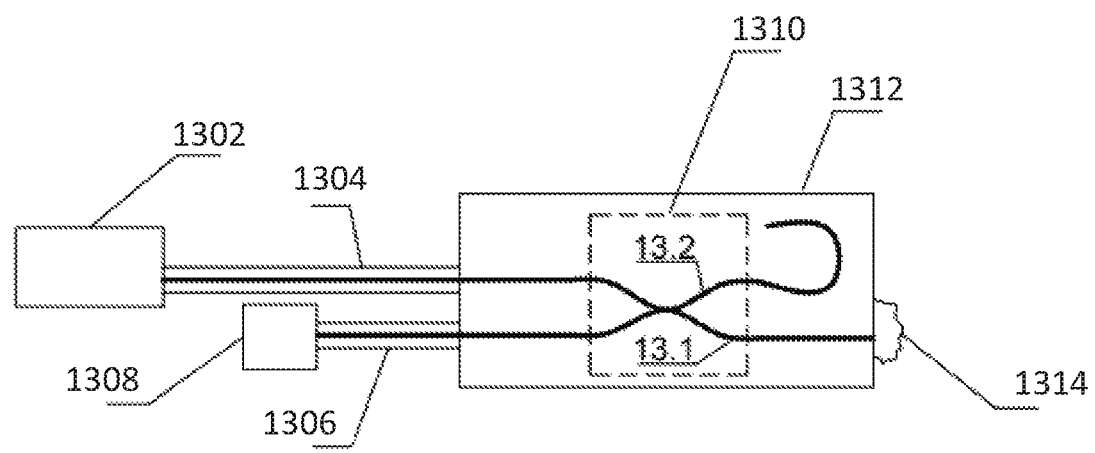
FIG. 13 shows a waveguide interferometer of a further example, in accordance with some embodiments.

In a beneficial embodiment of the invention, the planar waveguide technology based on PLC splitters (Planar Lightwave Circuit splitter) is applied. Referring to FIGS. 12-13, using an optical fiber 1304, a source 1302 is connected to a PLC splitter 1312. One of the outputs of the splitter 13.1 is activated by applying initial layer 1314 of material at a known thickness, and the second splitter output 13.2 is extended by 40 μm and hidden inside the splitter's housing 1312 to ensure the imbalance of the interferometer and stability of operation. The return arm of the splitter 1312 is connected to a decoder 1308 by means of an optical fiber 1306.

From the light source 1302, signal is directed through an optical fiber 1304 leading to the splitter 1312 at the splitter's input port. A detector 13108 is connected to the second input port through an input fiber 1306. The detector 1308 preferably comprises an optical spectrum analyzer. Signal from the light source is divided by the PLC splitter 1312 and reflects off the layer 1314 and the tip of the extended arm (e.g. 13.2), hidden in the housing. Reflecting off the tip 13.2 and the layer 1314, light returns on the same path, through the splitter 1312. The detector 1308 displays interference stripes in a spectral band (wavelength), and the shift and/or contrast of which depends on the change of optical thickness and/or the absorption of the layer 1314. In this case, a change of the optical thickness of the measured layer 1314 changes the position of the interference stripes.

In this beneficial embodiment, an equal-power splitter 1310 is used for a 1500 nm wavelength and a 2×2 configuration. A tungsten bulb with a light color corresponding to a black body of 1900 K is used as the light source 1302.

Signal from the light source 1302 is directed through the input fiber 1304 to the input splitter port. Detector 1308 is connected to the second input splitter port by means of an input fiber 1306. The detector 1308 is an optical spectrum analyzer. From the light source 1302, the signal is split in the PLC splitter 1312 and is then reflected off the layer 1314 and off the tip of the extended arm hidden in the housing 13.2. Reflecting off the tip 13.2 and the layer 1314, light returns on the same path through the splitter 1312. The detector 1308 displays interference stripes in a spectral band (wavelength), the shift and/or contrast of which depends on the change of optical thickness and/or the absorption of the layer 1314. In this case, a change of the optical thickness of the measured layer 1314 changes the position of the interference stripes.

The substance 1314 applied on the output port is ethylcellulose with a refractive index of approx. 1.4. Substance 1314 is applied on the port by immersing the double-core fiber in a 0.5% solution of butyl acetate, extracting it and drying. An optical fiber coated in this manner reacts to ethanol vapors, which cause it to swell. An approx. 50 nm change in the thickness of the layer causes the stripes to shift by approx. 10 nm.

What is claimed is:

1. A waveguide interferometer for measuring optical parameters, comprising:
    a light source configured to feed a light to a first core of a multicore waveguide at a first side of the multicore waveguide through a single core optical fiber that is coupled to the first core of the multicore waveguide, wherein the multicore waveguide is a multicore optical fiber and has at least the first core and a second core, where the first core has an output at a second side of the multicore waveguide, wherein a splitter is provided on the multicore waveguide, between the first side and the second side of the multicore waveguide, that splits the light from the light source between the first core and the second core, wherein the output of the first core is coated with at least one chemically active substance, and the first core is connected to a signal detector at the first side of the multicore waveguide through the single core optical fiber.

2. The waveguide interferometer according to claim 1, wherein the at least one chemically active substance is able to couple itself to another substance.

3. The waveguide interferometer of claim 1, wherein the at least one chemically active substance is able to detach from another substance when exposed to a selected environmental element.

4. The waveguide interferometer of claim 1, wherein the at least one chemically active substance changes one of thickness, absorption, or refractive index when exposed to a selected environmental element.

5. The waveguide interferometer of claim 1, wherein the multicore waveguide has more than two cores.

6. The waveguide interferometer of claim 1, wherein the first core of the multicore waveguide has a different length than the second core.

7. The waveguide interferometer of claim 1, wherein the first core of the multicore waveguide is extended at the second side of the multicore waveguide with at least one dielectric section selected from a group including: a glass pin, a waveguide, and an optical fiber.

8. The waveguide interferometer of claim 5, further comprising:
    a fan-in/fan-out element connected to the multicore waveguide at the first side of the multicore waveguide; and
    at least one additional detector, wherein the at least one additional detector and the light source are connected to the multicore waveguide through the fan-in/fan-out element.

9. The waveguide interferometer of claim 1, further comprising:
    a circulator having a first port connected to the light source, a third port connected to the signal detector, and a second port connected to the first core of the multicore waveguide through the single core optical fiber.

10. The waveguide interferometer of claim 1, wherein at least two of the cores are coated with different chemically active substances at the second side of the multicore waveguide.

11. The waveguide interferometer of claim 1 wherein the multicore waveguide is a polarization-maintaining waveguide.

12. The waveguide interferometer of claim 1, wherein the multicore waveguide is a multicore fiber and includes holes between the first core and the second core in a casing of the multicore fiber.

13. The waveguide interferometer of claim 1, wherein the splitter is a multicore fiber coupler provided on the multicore waveguide as an area having decreased crosswise dimension.

14. The waveguide interferometer of claim 1, wherein the splitter is a planar lightwave circuit splitter and the multicore waveguide is a planar lightwave circuit waveguide.

15. The waveguide interferometer of claim 1, wherein the chemically active substance comprises a substance selected of the group consisting of yttrium oxide, perfluorinated polymer, hydrolyzed collagen, polystyrene, and ethylcellulose.

* * * * *